United States Patent [19]

Cooper et al.

[11] 4,193,069

[45] Mar. 11, 1980

[54] LATCHING ALARM SMOKE DETECTOR

[75] Inventors: Glenn F. Cooper, Hingham; Robert B. Enemark, Duxbury, both of Mass.

[73] Assignee: American District Telegraph Company, Jersey City, N.J.

[21] Appl. No.: 885,370

[22] Filed: Mar. 13, 1978

[51] Int. Cl.[2] ...................... G08B 17/10; G01N 21/28

[52] U.S. Cl. .................................... 340/630; 250/574

[58] Field of Search ............................... 340/628, 630; 235/92 FP, 92 T; 307/233 R, 234; 356/207, 438, 338; 250/574, 573

[56] References Cited

U.S. PATENT DOCUMENTS 3,946,241 3/1976 Malinowski .................... 340/630 X

*Primary Examiner*—John W. Caldwell, Sr.
*Assistant Examiner*—Daniel Myer
*Attorney, Agent, or Firm*—James H. Grover

[57] ABSTRACT

An optical smoke detector with a clock pulsed light source and photodiodes responding to smoke scattered light includes an alarm initiating logic circuit which delays the initiating of alarm while several samplings of smoke are sensed and then latches the logic circuit in alarm condition.

5 Claims, 1 Drawing Figure

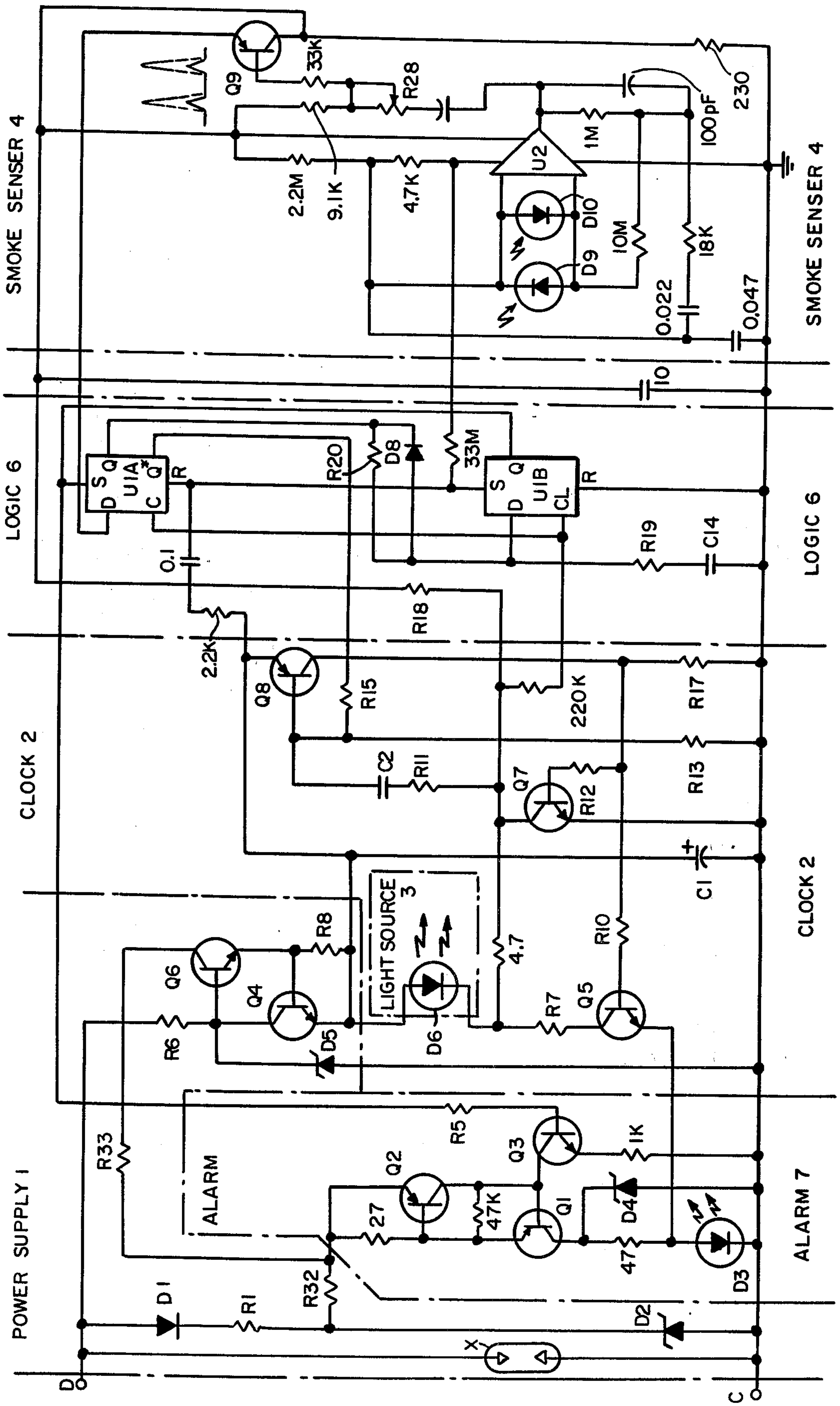
SMOKE SENSER 4
LOGIC 6
CLOCK 2
POWER SUPPLY 1
ALARM 7
LIGHT SOURCE 3
ALARM

LATCHING ALARM SMOKE DETECTOR

RELATED APPLICATIONS

Reference is made to U.S. patent application Ser. No. 880,065, filed June 20, 1977 and the application Ser. No. 885,369 of Glenn F. Cooper entitled OPTICAL PARTICLE DETECTOR and filed concurrently herewith, both of which applications are incorporated herein by this reference.

BACKGROUND OF THE INVENTION

This invention involves various electrical devices and apparatus for sensing physical conditions, such as smoke and other particle detectors, acoustic intrusion alarms, and the like, particularly apparatus wherein the physical sensing means is powered in pulses. For example, some optical smoke detectors now include a clock which controls supply of power to a light source as well as to smoke sensor circuits which process the electrical response of a photocell to which the pulsed light is scattered by smoke. In some installations, once the smoke sensing circuits determine that smoke has reached a predetermined alarm level of density, it is desirable that the apparatus be latched into an alarm condition.

In such pulsed detection circuits there is a problem resulting from the possibility that transient voltage surges in the power lines to the detector, electromagnetic voltages surges induced in the detector, and other electrical interference will spuriously simulate the photocells response to smoke scattered light pulses. It has been proposed that the effect of transient electrical surges be nullified by integrating the detected voltage pulses until an alarm level is reached as described in U.S. Pat. No. 3,872,499. Such a method, however, suffers from the disadvantage that short bursts of interference will be falsely integrated along with temporary smoke signals to cause a permanently latched alarm. Also long bursts of interference can be integrated to alarm level in the complete absence of smoke signals.

It is the object of the present invention to provide a logic circuit for a condition senser which discriminates against spurious smoke signals and does not latch in to alarm condition until after an adequate sampling has been made of the smoke or other physical condition.

SUMMARY OF THE INVENTION

According to the invention electrical apparatus for detecting a physical condition comprises a means for sensing a physical condition; a clock means controlling supply of periodically recurring power pulses to the sensing means such that the sensing means produces signal pulses at the clock rate upon sensing a predetermined physical condition; and a logic means coupled to the clock and sensing means and responsive to substantially synchronous clock and signal pulses therefrom to produce an alarm signal; wherein the logic means includes means timing a delay interval for a plurality of clock pulse periods, and means responsive to uninterrupted recurrence of condition signal pulses during the delay interval to latch the logic means in alarm signal condition.

DRAWING

The single FIGURE is a schematic diagram of an optical smoke detector electronic circuit according to the invention.

DESCRIPTION

The smoke detector shown in the drawing comprises the following major sections identified by legends:

Power Supply 1
Clock 2
Light Source 3
Smoke Sensor 4
Logic 6
Alarm 7

Power Supply 1

Electrical power at 5 to 30 volts, e.g. 24 volts, is supplied to the smoke detector circuit from an external two-wire line at power terminals D and C. A spark gap device X protects the circuit from line voltage surges. Type 1N4758 zener diodes D1 and D2, zener diodes D4 (1N5223A) and D5 (1N5236A) and resistors R1 (39 ohms), R32 (15 ohms) and R33 (1 kilohm) protect against reverse DC polarity. Circuit voltage is regulated by a type 2N3859A transistor Q6, resistor R6 (820 kilohms) and diode D5. Current in the circuit is limited by transistor Q4 (2N3414) and resistor R8 (3.3 kilohms).

Clock 2

DC power is not supplied continuously to circuit sections 3, 4 and 6, but rather is supplied periodically in brief recurrent power pulses controlled by a clock or pulse generator 2. The clock is essentially a free running multivibrator including transistors Q7 (D32H2) and Q8 (2N2907). Capacitors C1 (50 microfarads), C2 (1 mf) and resistors R11 (62 ohms), R12 (180 ohms), R13 (6.2 megohms), R15 (2.7 megohms) and R17 (47 kilohms) comprise time constant circuits controlling the charging and discharging of the timing capacitors C1 and C2 such that the two multivibrator transistors Q7 and Q8 conduct for a brief pulse deviation, e.g. 150 microseconds, at pulse intervals of 2.5 seconds. As will be explained in connection with Logic 6 the time constant can be altered by connecting resistor R15 through the logic circuit so as to shorten the pulse interval (speed up the pulse rate) when smoke of significant density is detected. A red light emitting diode (LED) D3 is flashed at the clock rate by a transistor Q5 (2N3414) whose base is connected to the multivibrator Q7, Q8 by a resistor R10 (1.2 kilohms).

Light Source 3

The smoke detector is of a well known optical type in which light from an exciter source is scattered by smoke to a sensing photocell. Such an optical smoke detector is shown and described in detail in U.S. Pat. No. 3,863,076. In the circuit shown the exciter is an LED D1, RCA type SG1010A flashed at the clock rate by current through transistor Q7 and a 4.7 ohm limiting resistor R9.

Smoke Sensor 4

Light from the exciter LED D6 is scattered by smoke to a smoke sensing photocell D9, preferably a photovoltaic diode, Clairex Corporation type CLD 56-1. Response of this smoke cell to undesired background light, as compared to smoke scattered light, is compensated by a second cell D10 which may be of the same or a different type as is explained in the copending, concurrently filed OPTICAL PARTICLE DETECTOR application of Glenn F. Cooper, the invention of which is disclaimed by coinventor Robert B. Enemark in this application.

As described in the immediately above-mentioned concurrent application and in the related application Ser. No. 880,065 the response of the smoke cell D9 to pulsed light scattered from smoke is a voltage or signal pulse amplified by an operational amplifier U2 (CD4013AE) whose output is applied to a level detector Q9 (MPS 3638). The threshold of the level detector is set by a 0 to 50 kilohm potentiometer R28. The value of other components of the smoke sensor circuit 4 are given conventionally as are the values of some other components throughout the drawing.

When the smoke which scatters light to the smoke cell D9 increases to a predetermined significant density the output of the level detector Q9 increases from pulses of a minimal voltage level shown as solid line waveforms to voltage pulses of significant voltage shown in broken line. These signal pulses are substantially synchronous and coincident with the clock pulses and are applied from the emitter of the level detector transistor Q9 to the data input D of a flip flop U1A in the logic circuit 6.

Logic 6

The logic section or circuit 6 comprises a dual data type flip flop such as RCA type CD4013AE identified and described fully in the aforementioned related application Ser. No. 880,065. The dual flip flop comprises two stages U1A and U1B, identical except for external circuitry. Each stage receives a clock pulse at its clock input C, and at the end of the clock pulse transfers the data signal at its data input D to its output Q as a continuous high signal, or, in the case of stage U1A, to its inverse output Q* as a continuous low or ground voltage. Thus in the absence of significant smoke signal pulses from the level detector Q9 the first flip flop has a continuous low level at its Q output and a continuous high level at its Q* output effectively removing the clock resistance R15 as a discharge path. When significant smoke is detected and a series of significant signal pulses are applied to the data input D of the first logic stage U1A a high voltage appears at its output Q for the interval of each pulse and the output Q* effectively grounds the clock resistor R15 increasing the conductance in the discharge path of the clock timing capacitor C2 and increasing the clock pulse rate, so that the smoke condition is sensed or sampled more frequently in or about alarm condition. Simultaneously a continuous high signal at the output Q of the first stage U1A supplies charging current through latching timing resistors R19 (2.2 kilohms) and R20 (8.2 megohms) to a latch timing capacitor C14 (1 microfarad). Spurious transient voltages at the data input U1A-Q do not alter the charging rate of the latch timing capacitor C14, nor will a burst of voltage surges under six seconds long have an effect. If significant smoke signals continue for the delay interval of six seconds and the timing capacitor C14 charges to about one half the supply voltage, this voltage is applied to the data input D of the second flip flop stage U1B producing a high voltage at its output Q which latches both stages in alarm condition with alarm signals at their outputs Q. If, however, the pulses at the data input D of the first stage U1A are partly spurious and one sped up clock pulse is not accompanied by a smoke signal pulse, then the timing capacitor C14 will be discharged abruptly through a blocking diode D8 (1N4454) and the now low Q output of stage U1A.

Alarm 7

In the event of uninterrupted significant smoke condition pulses continued for the six second delay time, the latching high voltage at the output Q of the second stage U1B is also applied through a resistor R5 (10 kilohms) to a relay transistor Q3 (2N3895A). Conductance by Q3 causes an alarm transistor Q1 (MJE171) to conduct, effectively short circuiting the line terminals D, C. As is well known shorting of the DC lines constitutes an alarm detected at a central control panel. Alarm is also indicated by continuous illumination of the indicator LED D3. Current through the alarm transistor Q1 is, however, limited by an associated transistor Q2 (MPS 3638).

It should be understood that the present disclosure is for the purpose of illustration only and that this invention includes all modifications and equivalents which fall within the scope of the appended claims.

We claim:

1. Electrical apparatus for detecting an alarm condition comprising:
   means for sensing a physical condition;
   clock means controlling supply of periodically recurring power pulses to the sensing means such that the sensing means produces signal pulses at the clock rate upon sensing a predetermined physical condition; and
   logic means coupled to the clock and sensing means and responsive to substantially synchronous clock and signal pulses therefrom to produce an alarm signal;
   wherein the logic means includes means timing a delay interval for a plurality of clock pulse periods, a two condition device responsive to substantially synchronous clock and signal pulses to activate the timing means independently of signal pulses, and means responsive to uninterrupted recurrence of condition signal pulses during the delay interval to latch the logic means in alarm signal condition.

2. Apparatus according to claim 1 wherein the logic means includes a first data flip flop responsive to condition signals to produce a charging current, a resistive-capacitative timing network storing the charging current over a delay interval, and a second data flip flop connected to the timing network and first data flip flop and responsive to charging of the network to a predetermined level to transmit a latching signal to the first data flip flop.

3. Apparatus according to claim 1 wherein the two condition device has an output terminating the delay timing when a clock pulse is unaccompanied by a signal pulse.

4. Apparatus according to claim 1 wherein the delay means includes a capacitor and the device has an output supplying continuous charging current to the capacitor.

5. Apparatus according to claim 4 including a second device responsive to charging of the capacitor to a predetermined level to latch the two condition device in alarm producing condition.

* * * * *